May 26, 1959 V. T. WHITLOW 2,888,507
AUTOMATIC SAFETY DEVICE FOR VEHICLES
Filed Feb. 15, 1956 3 Sheets-Sheet 1
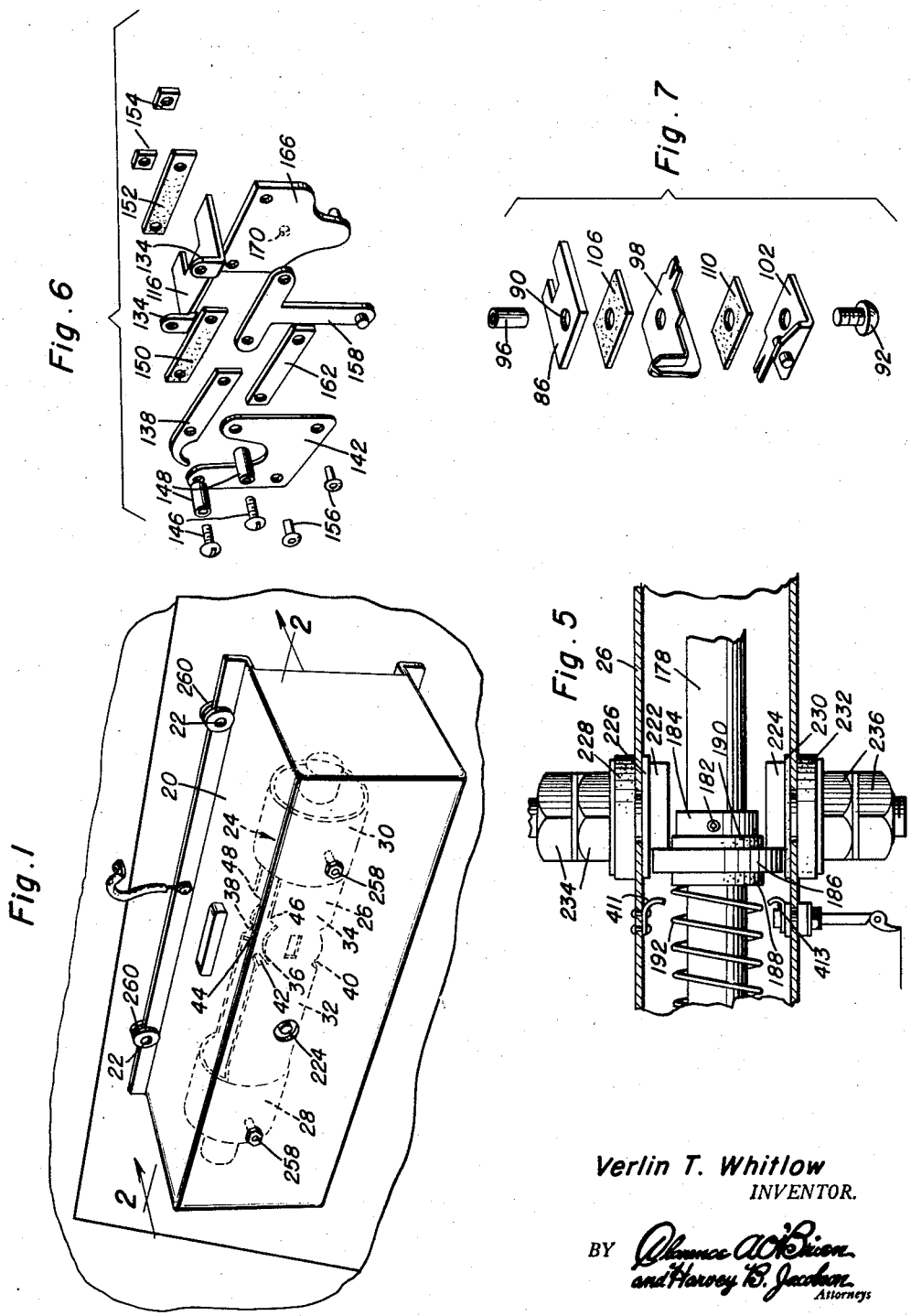
Verlin T. Whitlow
INVENTOR.

May 26, 1959     V. T. WHITLOW     2,888,507
AUTOMATIC SAFETY DEVICE FOR VEHICLES
Filed Feb. 15, 1956     3 Sheets-Sheet 2
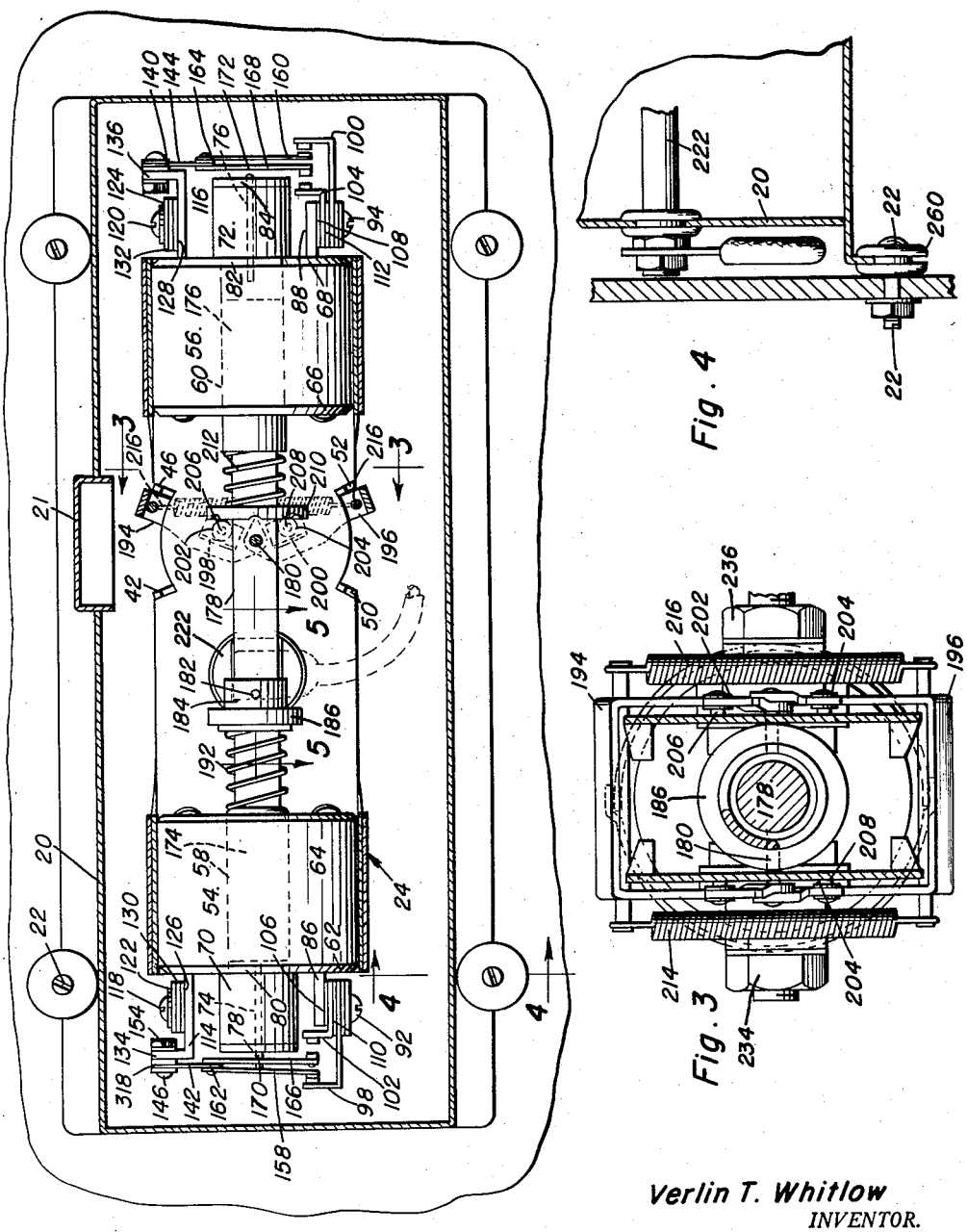
Verlin T. Whitlow
INVENTOR.

May 26, 1959  V. T. WHITLOW  2,888,507
AUTOMATIC SAFETY DEVICE FOR VEHICLES
Filed Feb. 15, 1956  3 Sheets-Sheet 3
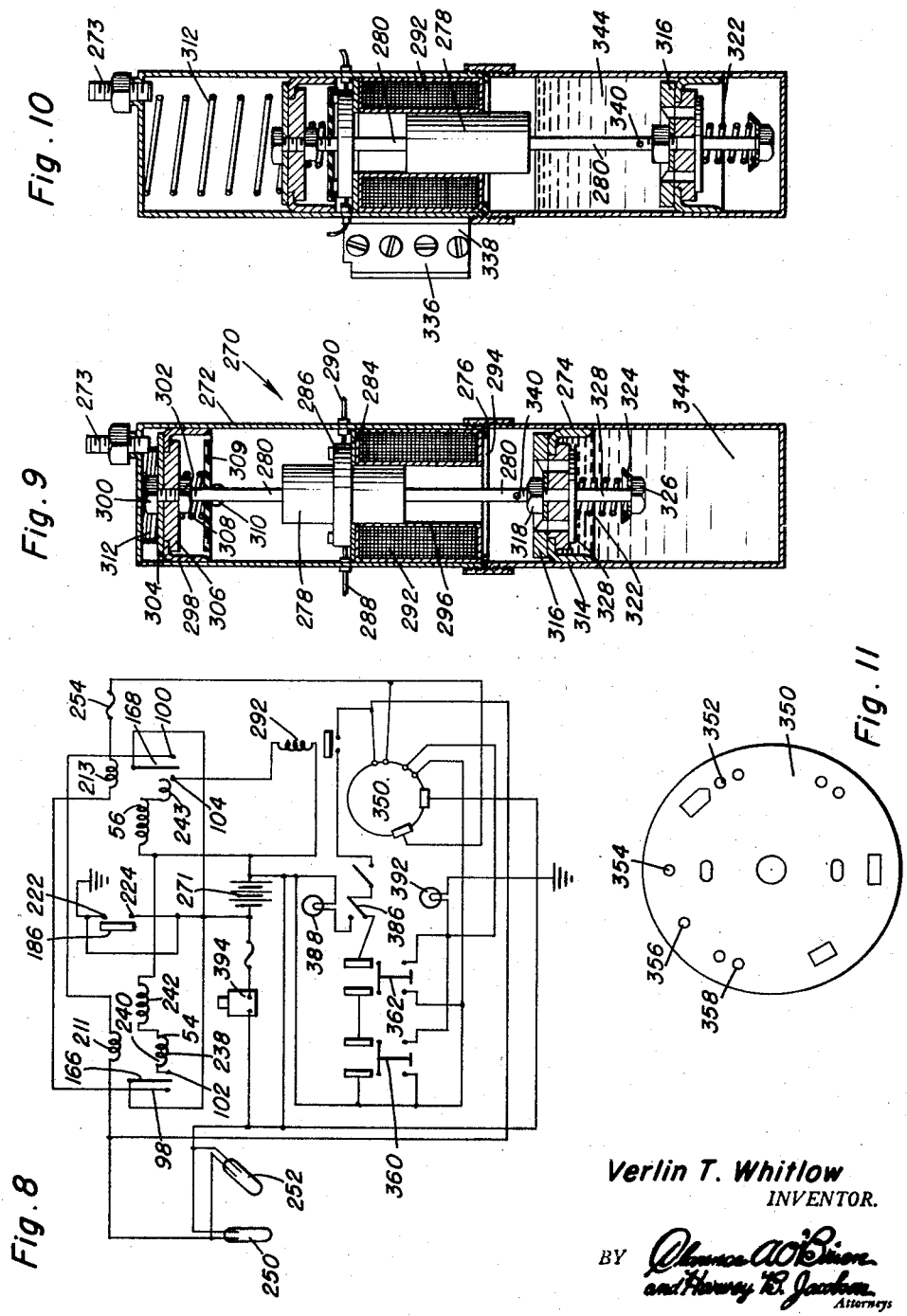
Verlin T. Whitlow
INVENTOR.

United States Patent Office 2,888,507
Patented May 26, 1959

2,888,507
AUTOMATIC SAFETY DEVICE FOR VEHICLES
Verlin T. Whitlow, Poplar Bluff, Mo.
Application February 15, 1956, Serial No. 565,646
3 Claims. (Cl. 123—146.5)

This invention relates to an automatic switch for vehicles and more particularly to a master switch assembly for safeguarding the electrical system of a vehicle.

The primary object of the present invention resides in the provision of a compact automatic device adapted to be installed on a vehicle, such as an automobile, truck or the like for use in disconnecting the battery of the vehicle from ground, thereby opening substantially the entire electrical system of the vehicle to thereby prevent the possibility of fires caused by defective operation of a part of the electrical system of the vehicle.

A further object of the invention resides in the provision of a master control switch which is adapted to disconnect the ground cable of the battery automatically in the event of collision or overturn of the vehicle.

A further object of the invention resides in the provision of an automatic device having a vacuum and fluid timer for providing delayed action so as to prevent the master control switch from being turned off accidentally while the vehicle is in operation.

The construction of this invention features a master switch assembly which is provided to connect or disconnect the battery of the vehicle to ground. The master switch assembly is provided with magnetic means for actuating the contact making operating rod, which rod is operated by the magnetic means in conjunction with snap action break-over arms. The operating rod filled with the magnetic means actuates sets of contacts which control the electrical circuits to the various appliances and other electrical components of the vehicle. The vacuum and fluid timer prevents the master switch from being turned off accidentally while the vehicle is in operation, yet, in the event lights are left on when the vehicle is unoccupied or the voltage regulator or stop lights stick or other electrical short develops while the automobile is not in operation, upon the operation of the timer and the passage of the selected period of time, the battery ground is automatically disconnected. A road emergency switch in the form of a toggle switch is conveniently located on the lower edge of the instrument panel for use in leaving the battery connected to ground even though the master switch assembly is in an off position by by-passing the switch, thus allowing parking lights or warning lights to be left on after the ignition key has been removed and the door closed.

Still further objects and features of this invention reside in the provision of an automatic safety device for vehicles that is simple in construction, highly efficient in use, and relatively inexpensive to install, thereby permitting wide use and distribution.

These, together with the various ancillary objects and features of the invention which will become apparent as the following description proceeds, are attained by this automatic safety device, a preferred embodiment of which has been illustrated in the accompanying drawings, by way of example only, wherein:

Figure 1 is a perspective view of the housing for the invention showing the master switch assembly in phantom lines;

Figure 2 is an enlarged longitudinal sectional view as taken along the plane of line 2—2 in Figure 1;

Figure 3 is a vertical sectional view as taken along the plane of line 3—3 in Figure 2 showing in an enlarged scale the construction of the snap action break-over arms utilized in the invention;

Figure 4 is a sectional detail view as taken along the plane of line 4—4 in Figure 2 illustrating the mounting arrangements for the invention;

Figure 5 is an enlarged sectional detail view as taken along the plane of line 5—5 in Figure 2 illustrating in a plan view the construction of the contact stop bridging means mounted on the operating rod;

Figure 6 is an exploded perspective view of certain of the contact arrangements utilized in the invention;

Figure 7 is another perspective view of other of the contacts utilized in the invention;

Figure 8 is a schematic wiring diagram of the various electrical components of the invention as associated with the electrical components of a vehicle;

Figure 9 is a sectional view of a vacuum and fluid timer;

Figure 10 is another sectional detail view of the vacuum and fluid timer shown in a different position; and Figure 11 is a schematic view of an ignition switch modified for use in conjunction with the present invention.

Referring now to the accompanying drawings wherein like reference numerals designate similar parts throughout the various views, reference numeral 20 is used to generally designate the box in which the master switch is mounted. This mounting box 20 is preferably dust and water-tight and is preferably mounted under the hood or fire wall or on the inside of a fender panel, as is convenient, extending parallel with the longitudinal axis of the vehicle, but if convenient to mount on the fire wall, the box 20 may be mounted parallel to a transverse axis of the vehicle, though particular attention must be had to the position of an angularly disposed mercury switch as will be hereinafter made clear.

Mounted in the mounting box 20 which is secured by any suitable fasteners, as at 22, to the vehicle is the master switch assembly 24 which is shown in phantom lines in Figure 1. This master switch assembly 24 includes an outer casing 26 preferably formed from two substantially similar side plates preferably shaped and then joined together so as to form two end coil receiving sections 28 and 30, an arcuate portion 32 and a substantially flat portion 34. Arcuate recesses, as are shown at 36, 38, 40 are formed in the upper and lower edges of the flat portions of the side plates forming the casing 26 and the cut-out portion of the side plates are bent inwardly toward each other to form lips as are indicated at 42, 44, 46 and 48, and 50, 52, see Figure 2.

Mounted within the coil receiving sections 28 and 30 are off and on coils 54 and 56 mounted upon operating coil forms 58 and 60. Each of the operating coil forms 58 and 60 has a shoulder belled out and crimped to act as a retainer for the ends of the coil form washers 62, 64, 66 and 68 whose center hole is countersunk to receive the retainers of the forms 58 and 60.

Affixed to washers 62 and 68 are actuating coil core and relay operating plunger guides 70 and 72 which are preferably made of soft iron, such as that used in voltage regulators in automobiles and are drilled lengthwise through the centers thereof to receive relay operating plungers 74 and 76.

The relay operating plungers 74 and 76 extend through actuating coil form ends 78, 80, 82 and 84 which are washers of suitable metallic material.

Referring now more particularly to Figures 2 and 7, it will be seen that affixed to the operating coil form end washers 62 and 68 are point plate anchor plates 86 and 88 which are substantially U-shaped and which are provided with apertures, as at 90, therethrough threaded for reception of retaining screws 92 and 94. Receivable over the retaining screws 92 and 94 are insulative sleeves, as at 96, which insulate inner point plates 98 and 100 from outer point plates 102 and 104, the shapes of which are readily ascertainable from an inspection of Figure 7. Suitable insulative washers 106, 108, 110 and 112 are provided.

Also secured to the operating coil form end washers 62 and 68 are point arm and connector bases 114 and 116, the shape of which can be best seen in Figure 6. Suitable cap screws 118 and 120 are provided to hold actuating coil connectors 122 and 124 and operating coil connectors 126 and 128 in position insulated from each other by insulative washers 130 and 132, as well as by suitable insulative sleeves, not shown.

Secured to the pair of ears, as at 134 and 136, extending upwardly from the bases 114 and 116 respectively are operating coil connector lugs 138 and 140 as well as substantially U-shaped point arm hinge and contact members 142 and 144. These elements are held in place by suitable cap screws, as at 146, which extend through insulative sleeves 148, through apertures in the respective elements and through suitable insulating washers 150 and 152, see Figure 6, and are threaded into nuts 154.

Pairs of rivets, as at 156, are utilized to secure T-shaped actuating coil point arms 158 and 160 in position and these point arms are insulated by insulative washers, as at 162 and 164, from operating coil point arms 166 and 168 provided with point operating plunger stops, as at 170 and 172 formed of a hard insulating material and turned down, leaving a head to come into contact with the operating plungers 74 and 76.

Movable in the forms 58 and 60 are operating pistons 174 and 176 which have extensions which are threaded for threaded engagement with the operating rod 178. Press fitted in the operating rod 178 is an operating rod carrying pin 180. A master switch contact washer assembly stop pin 182 is also press fitted into the operating rod 178 and holds the master switch contact washer assembly stop 184 in place.

As can be best seen in Figure 5, a master switch contact washer 186 is mounted on the operating rod 178 and insulative washers 188 and 190 are mounted on either side thereof and is engaged by a master switch contact washer tension and thrust equalizing spring 192. This spring engages the piston 174.

Pivotally mounted on the pin 180 are break-over arms 194 and 196 of substantially U-shape so as to overlie and underlie respectively the side walls forming the housing 26 and which are adapted to engage the stops formed by the lips 42, 44, 46, 48, 50 and 52. Suitable bearing rollers may be provided for an antifriction mounting of these break-over arms which are also slotted, as at 198 and 200, for reception of rollers 202 and 204 rotatably mounted on pins 206 and 208 extending all the way through the casing 26. The pins 206 and 208 are break-over arm slide roller anchor pins and are adapted to be engaged by a thrust equalizing spring stop 210 provided with suitable recesses to receive the pins 206 and 208 and also with a centrally disposed recess to receive the pin 180. The stop 210 is engaged by thrust equalizing spring 212 which engages the piston 176. Break-over arm lock springs 214 and 216 are terminally secured to the respective break-over arms 194 and 196 in any convenient manner, such as to pins secured to the respective break-over arms.

At 411 is shown the ground post to ground out the ignition when the master switch is turned off, see Figure 5. A further post 413 is wired to the ignition coil on the distributor side thereof.

A pair of battery cable connectors comprising copper bolts 222 and 224 are secured in the casing 26 and are insulated therefrom by suitable insulative washers and sleeves, as at 226, 228 and 230, 232, respectively. Pairs of nuts for anchoring the battery terminals are secured on the bolts 222 and 224, as indicated at 234 and 236.

Mounted in the actuating coil cores and plunger guides 70 and 72 are a pair of point actuating coils 211 and 213 consisting of a suitable number of layers of enameled copper wire which are wound from outer ends clockwise with leads terminating on the sides of the finishing coil.

The operating coil 54 is formed in two parts, as at 240 and 242, see Figure 2, and is wound about the forms 58 and 60 and has thin insulation installed during assembly before the coil is wound. Coil 56 is similar in its two-part construction to coil 54. Each of the coils is started by feeding a suitable length of wire through an insulation lines hole as near to the form as possible and is wound in a counter-clockwise direction to the outer end of the actuating coil housing terminating at the operating coil conductor lug 138. The master operating coil is wound in the same direction and consists of a suitable number of layers with the end passing through the insulation line notch or hole in the operating coil form and washer 62 as close to the outer edge as practical and terminating at the operating coil connector 126.

Mounted in the box 20 are a pair of mercury switches 250 and 252. A fuse plug 254 is also housed in the box 20. The master switch unit 24 is secured to the box 20 by means of mounting studs, as at 258, and the battery connector bolts 222 and 224. The box 20 is mounted utilizing suitable rubber cushioning grommets, as at 260, such as are used to mount voltage regulators, and it is noted that the mounting of the mercury switch 252 is very exacting. The switch 252 is angled forwardly sufficiently to allow mercury to flow against the contacts when vehicles collide with some object or other vehicles, while at the same time, must not be such as to allow the mercury to make contact under such circumstances as when brakes are applied while the vehicle is descending a steep grade. Therefore, the mercury switch 252 is positioned so as to be accelerative and position selective. The mercury switch 250 is mounted at a 290° angle and is set to make contact and turn the master switch off instantly in the case of upset or overturn. The box 20 is provided with a gasketed inspection lid 21.

In the utilization of this invention, a timer, as is shown in Figures 9 and 10, is utilized. This timer is generally designated by reference numeral 270 and is an electro-hydraulic type timer. The timer includes a housing 272 secured to a chamber 274 by a threaded lock ring 276. Secured in the piston 278 and extending outwardly on both sides of the piston 278 with the piston 278 swaged thereto is a connecting rod 280 which is threaded at the ends.

Positioned on a core form end washer 284 is a contact point ring 286 of very hard insulating material to which the conductors 288 and 290 are attached for connection to the coil 292 supported by the core positioning washer 294. The piston 278 is slidable within the inner core form 296 and the piston 278 is actuated by the coil 292. At the upper end of the connecting rod 280, there is secured a vacuum chamber cup 298 held in place by nuts 300 and 302 which also hold in place the vacuum seal outer washer 304 as well as the vacuum seal inner washer 306. A contact washer tension spring 308 is provided for holding the contact washer 309 in proper place and to keep it from moving under vibrating conditions of the vehicle. A stop 310 is provided on the connecting rod 280 and biasing the outer washer 304 is a timer operating return spring 312.

A fluid chamber cup 314 is held in place on the lower end of the rod 280 by the use of a valve seat and timer cup retainer 316 held in place by nut 318 and provided with ports 320. A coil spring 322 biases a cup 324 into engagement with a nut 326, and there is provided a sleeve 328 which extends through the valve member 316, and through the timer seal loading valve 328 formed of neoprene or thick rubber. The spring 322 thus holds the weight of the valve 328 against the valve seat member 316.

Mounted on the timer housing 272 is a bracket 336 as well as a terminal block 338. The lower end of the connecting rod 280 is drilled for the timing port or fluid by-pass, and is in communication with an aperture, as at 340. Upon turning on of the master switch which has the timer operating coil 292 wired in parallel, the timer will immediately start its downward stroke. The timing port is small enough to hold the contact washer from reaching the timer points for a period of about 90 seconds. The timer is provided with hydraulic fluid or other suitable liquid, as at 344. The circuit leads of the timer pass through the outer walls of the vacuum chamber through fiber insulators which allow sufficient vents for the vacuum chamber to breathe on the loading stroke to allow cups to descend after vacuum is released.

A special ignition switch, as can be seen in Figure 11 and designated by reference numeral 350 is provided whose plate differs from that of a conventional key start switch by containing the extra position of definite off, as is indicated by 352. The on completing points is the conventional normal position 354. The accessory contact points as at 356 and 358 are shorted together, either externally or internally, whichever is more convenient, and the angles of 100° and 130° have been found most practical for the contacts and contact arm points to allow the points ample room to avoid internal shorts.

When the vehicle is unoccupied and the key has been turned to the normal off position, and the off circuits are closed, the master switch will turn the battery off. When a door is opened, as for entering a vehicle, the battery is automatically restored to normal operation, as will be made more apparent henceforth due to the function of the door switches, as are indicated at 360 and 362 in Figure 8.

The operation of this invention is as follows:

With the master switch in an off position, the master switch is then turned on. This excites the operating coil 56 by the battery 271 being arranged to complete the circuit connection to the coil upon the closure of the ignition switch 350 to the on position. On actuating coil 243, see Figure 8, exerts sufficient magnetic force on the piston 176 to overcome the action of the break-over arms 194 and 196, with the counterbalancing action of the equalizing spring 212.

As the operating rod 178 comes to the center of its travel, the operating rod carrier pin 180 engages in the slot in the thrust equalizing spring stop 210 bringing this stop 210 along the remainder of the travel. The break-over arm locks springs 214 and 216, keeps the operating rod and pistons moving until the master switch contact washer 186, see Figure 5, makes contact with the master switch contact points and battery cable connector bolts 222 and 224 and compresses the master switch tension spring 192. The master switch washer 186 contacts the bolts 222 and 224 just slightly after the break-over arms reach their extended position and start to exert thrust on contacts. As the piston 176 moves toward its maximum position, it comes in contact with relay operating plunger 76 pushing it against point operating plunger 172 forcing operating point arm 168 away from the inner point mechanically. At the same time, it forces actuating core point arm 160 out making contact with the actuating point 100 which breaks the connection to coil 56. Upon further actuation, the off actuating coil 238 will then function, and the only difference in the action is that of the master switch contact spring 192 which serves as a thrust equalizing spring in the first half of the off cycle of operation.

In its use in a vehicle, when the contacts 186 and 222 and 224 are broken, the ground cable or the battery of the electrical system is automatically disconnected. To accomplish this, as when an occupant leaves the vehicle, the ignition switch is turned to the off position, closing the off completing circuit in the ignition switch proper on through the road emergency switch 386, see Figure 8, and the door switches 360 and 362 and through the outer relay points 98, 166 and 102 energizing the actuating coil, closing the inner relay points 104, 168 and 100, tripping the master switch to the off position. Under normal circumstances, the road emergency switch 386 will be in a position shown in the wiring diagram. When the road emergency switch is thrown, it prevents the master switch from disconnecting the battery by breaking the circuit to the off actuating relay coil 238. At the same time, it connects a neon type bulb 388 preferably mounted in the instrument panel, which shows a preferably red light indicating that the unit is not off, nor can it be turned off by the door switches when the road emergency switch is in this position.

The mechanical action of the timer 270 keeps the circuit from turning off immediately, or between the time the vehicle is entered and the door closed and the time the key is turned on. In the event the ignition switch is not moved from the normal off position within the limit of the timer, the master switch will turn off. The opening of either door or turning on the ignition switch will immediately turn the master switch on again. Two mercury switches are connected directly to the off actuating relay coil 238, the switches being switches 250 and 252. In the event of upset or collision, either one or both of these switches will instantly trip the master switch to off, rendering the vehicle's normal wiring inoperative.

The dome light 392, while wired to the on circuit will not have current flowing in the circuit until after the master switch is on due to its dependence on the vehicle frame or chassis for the completion of its circuit.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A master switch assembly comprising pairs of spaced fixed contacts, pairs of movable contacts, each pair of said movable contacts being arranged between a pair of fixed contacts, one of each of said pair of movable contacts normally engaging one of each of said pairs of fixed contacts, movable plungers mounted proximate said movable contacts for simultaneously actuating said pairs of movable contacts for disengaging said one of each of said pairs of movable contacts and engaging the other of each of said pairs of movable contacts with the other of each of said pairs of fixed contacts, said plungers being engaged by a pair of slidable pistons, said pistons being interconnected by an actuating rod, magnetic means for actuating said actuating rod, retaining means for maintaining said rod in only selective positions, said means including snap action break-over arms pivoted to said rod, a pair of contact stops, and a bridging contact carried by said rod for electrically bridging said contact stops.

2. An automatic switching system for safe-guarding the electrical system of a vehicle comprising a master switch assembly electrically interposed between the battery of the vehicle and ground and a control circuit for selectively operating said master switch assembly, said control circuit including an ignition switch electrically connected in series with said battery, condition responsive switches electrically interposed in series connection with said ignition and said battery, an actuating relay coil electrically in series with said ignition switch, condition responsive switches and said battery, relay points operable by said actuating coil, said master switch assembly including pairs of spaced fixed contacts, pairs of movable contacts, each pair of said movable contacts being arranged between a pair of fixed contacts, one of each of said pair of movable contacts normally engaging one of each of said pairs of fixed contacts, movable plungers mounted proximate said movable contacts for simultaneously actuating said pairs of movable contacts for disengaging one of each of said pairs of movable contacts with the other of each of said pairs of fixed contacts, said plungers being engaged by a pair of slidable pistons, said pistons being interconnected by an actuating rod, magnetic operating coil means for actuating said actuating rod retaining means for maintaining said rod in only selective positions, said means including snap action break-over arms pivoted to said rod, a pair of contact stops, and a bridging contact carried by said rod for electrically bridging said contact stops, one of said contact stops being electrically connected to ground, the other of said stops being electrically connected to said battery, said magnetic operating coil means electrically connected in series with said relay points whereby said master switch assembly will operate to open the electrical circuit of an automobile in response to predetermined conditions.

3. The combination of claim 2 including time delay means electrically serially connected between said ignition switch and said battery for providing a time delay for a response by said master switch assembly after said ignition switch has been actuated.

References Cited in the file of this patent

UNITED STATES PATENTS

| | | |
|---|---|---|
| 2,000,136 | Huss | May 7, 1935 |
| 2,502,580 | McMillan | Apr. 4, 1950 |
| 2,521,969 | Dugan | Sept. 12, 1950 |
| 2,581,737 | West | Jan. 8, 1952 |